United States Patent Office 3,291,712
Patented Dec. 13, 1966

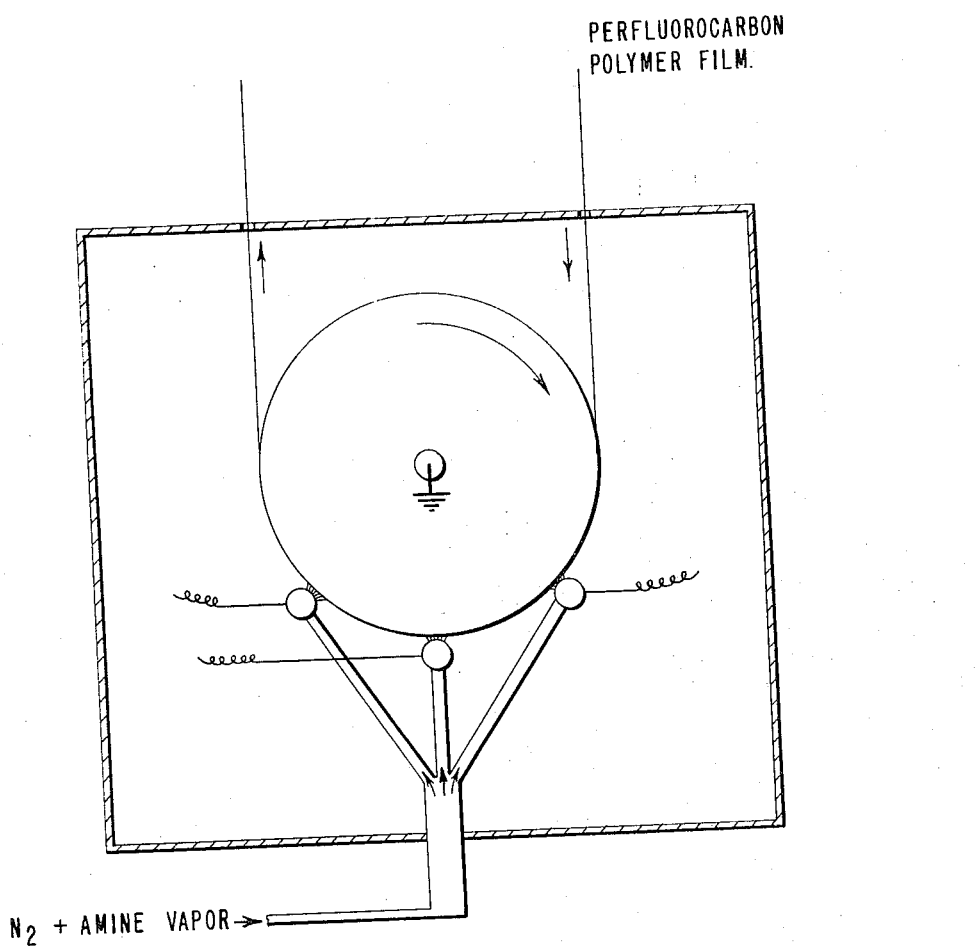

3,291,712
SURFACE TREATMENT OF SHAPED ORGANIC
POLYMERIC STRUCTURES
Richard T. McBride, Buffalo, N.Y., assignor to E. I. du
Pont de Nemours and Company, Wilmington, Del., a
corporation of Delaware
Filed Oct. 1, 1963, Ser. No. 313,081
8 Claims. (Cl. 204—165)

This invention relates to polymeric shaped structures and more particularly to a process for rendering adherable the surface of such structures.

It is well known to take advantage of the properties of various polymeric shaped structures such as films by adhering them to other materials. For example, the perfluorocarbon polymers are very resistant to most chemicals and solvents and they are used as liners for pipes and vessels in which corrosive chemicals are transported or stored.

A difficulty encountered in forming many structures of this type is that of poor adhesion; the perfluorocarbon polymers, for example, suffer from an extremely low degree of adherability to practically all materials including low adherability to other perfluorocarbon polymeric structures. The use of common adhesives does not provide adequate bonding of these polymers to other materials and little if any adherability is imparted by the use of an electrical discharge treatment such as is described in British Patent 715,914, which treatment is known to improve adhesion of inks and other materials to various polymeric structures.

It has been found that an appreciable improvement in adherability can be realized in a process wherein the surface of the polymeric film is treated in an electrical discharge in an atmosphere of an organic vapor such as described in patent application Serial No. 282,947 filed on May 24, 1963 by Richard T. McBride and Leon E. Wolinski and patent application Serial No. 92,330 filed on February 28, 1961 by Leon E. Wolinski, both now abandoned. Even with this treating process, however, it is found that the adherability of a perfluorocarbon surface is not sufficiently great for readily bonding the treated film to such surfaces as metal foils and certain organic polymer films and rather extreme laminating conditions are required.

It is therefore an object of this invention to provide a process for the surface treatment of preformed structures whereby to render the surfaces strongly adherable to other materials. It is a further object to provide a process for the surface treatment of preformed structures of perfluorocarbon polymers whereby to render the surfaces readily and strongly adherable to metal foils and other polymeric films. A still further object is to provide a continuous process for rendering the surface of a film of a copolymer of tetrafluoroethylene and hexafluoropropene readily and strongly adherable to metal foils and other film surfaces. The foregoing and related objects will more clearly appear from the following description ana examples.

These objects are realized by the present invention which, briefly stated, comprises subjecting the surface of an organic polymeric shaped structure to the action of an electrical discharge at substantially atmospheric pressure between spaced positive and negative electrodes maintained at a voltage differential in excess of about 1000 volts, said electrical discharge having an energy level below 15 electron volts, in a substantially oxygen gas-free atmosphere containing less than about 5% by volume of the vapor of an amine in an inert gaseous carrier, whereby to render said surface strongly adherable to other materials.

In the preferred embodiment of this invention, illustrated diagrammatically in the accompanying drawing, a continuous web of preformed self-supporting film of a perfluorocarbon polymer is continuously passed between a set of spaced electrodes consisting of a rotating metal roll 1 which is connected electrically to ground, and one or more stationary hollow metal tubes 2 disposed parallel to the longitudinal axis of the roll and spaced a distance of from 0.03 to 0.125 of an inch from the surface thereof. The tubes are each connected electrically to a suitable power source which supplies to each tube electrode an alternating (or pulsating direct) current of from 0.3 to 2.1 R.M.S. (root mean square) ampere at a voltage in the range of 10,000 to 30,000 volts, with pulsating peak voltages up to 100,000 volts, and at a frequency of at least 350 cycles per second and preferably in the range of 300,-000 to 500,000 cycles per second. The power to the electrodes ranges from 10 watts/lineal inch of electrode length to 100 watts/lineal inch, and the exposure time is not less than $4 \times 10^{-4}$ second. The vapor of an amine, preferably a polyamine such as ethylene diamine or diethylene triamine in a suitable carrier gas such as nitrogen, is continuously fed to the hollow interior of the electrode tubes through distributor ducts 3 and issues from the tubes at the gap between each tube and the roll through suitable openings along the length of the tubes, whereby the electrical discharge between the electrodes takes place at atmospheric pressure in a non-oxidizing atmosphere containing the mixed vapors. The assembly just described is suitably enclosed in a chamber 4, provided with the necessary openings, to facilitate maintenance of an oxygen gas-free atmosphere in the treating zone, and controlled exhaust of the mixture of nitrogen and amine vapor therefrom, and to minimize operational hazards. The vapor may also be introduced into the reaction zone through one or more tubes separate from the electrode assembly. It should be understood that the film may be treated at normal room temperatures (25° C.) or at elevated film temperatures up to 150° C. In general the permanency of the effect of the treatment, i.e. adherability, is enhanced by maintaining the film at a temperature substantially above room temperature during treatment, e.g., at a temperature of from 30° to 95° C.

With respect to the amines which may be employed to provide the vaporous atmosphere in which the electrical discharge treatment is carried out, it is required that the amine be one which vaporizes (at atmospheric pressure) at or below the temperature at which the treatment is carried out and that it be devoid of other functional groups. Typical amines suitable for purposes of this invention include methyl amine, dimethyl amine, trimethyl amine, ethyl amine, diethyl amine, triethyl amine, propyl amine, butyl amine, amyl amine, hexyl amine, cyclohexyl amine, decyl amine, methyl ethyl amine, tertiary butyl amine, ethylene diamine, propylene diamine, butylene diamine, diethylene triamine, dipropylene triamine, triethylene tetramine, tetraethylene pentamine and similar polyamines. The polyamines are preferred.

A further requirement is that the amine vapor be employed as a dilute solution in a suitable carrier gas. In general, the concentration of the amine vapor in the carrier gas should not be greater than about 5% by volume. At higher concentrations unsatisfactory surface treating of the preformed structure results. The carrier gas should have characteristics such that it does not interfere with the maintenance of a continuous electrical discharge between the electrodes. Some gases with too low a breakdown potential may permit excessive arcing across the electrodes; those with too high dielectric strength tend to repress the electrical discharge. Particularly suitable carrier gases are nitrogen or carbon dioxide. Such gases as hydrogen or helium are also operable.

Vapors of the vaporizable amine are conveniently introduced into the treating zone by bubbling nitrogen through the liquid to be vaporized at a rate of one-half cubic foot/minute up to 10 cubic feet/minute. No adverse effects have been observed in the use of higher flow ratios though economic considerations would dictate against use of amounts exceeding those required to produce the desired results.

The difference in potential between the positive and negative electrodes may vary from very low voltages in the order of 1000 volts up to pulsating voltages of 100,000 or more. In general, it is preferred to maintain the voltage in excess of 2000–3000 volts.

Frequencies may range from 350 cycles/second up to 500,000 cycles/second and above. Frequencies in the range of 300,000 to 500,000 cycles/second are preferred in order to obtain effective treatment at commercially acceptable exposure times.

In general, the effectiveness of the treatment increases with amount of current to the electrodes for a given area of electrode and time of exposure. Current to the electrodes may range up to 5.5 R.M.S. (root means square) amperes or higher. However, it is preferred to operate in the range of 0.3 R.M.S. ampere to 2.1 R.M.S. amperes to give resonable treating times on the one hand, and to avoid rapid degradation of the electrodes at too high currents on the other hand. Power to the high frequency generator may range from 10 watts/lineal inch of the electrode length to 1800 watts/lineal inch of the electrode length. The electrical discharge employed herein, operating within the parameters above specified, has an energy level below 15 electron volts, and is not to be confused with the high or intermediate energy irradiations heretofore used to treat polymeric surfaces.

The electrodes are preferably spaced from about 0.03 inch to about 0.125 inch apart. Useful results can be obtained when the electrode gap is as low as 0.015 inch to as much as 0.25 inch provided suitable adjustments in such features as amount of current, electrode dimension and exposure time are made.

Time of exposure to the electrical discharge treatment is not especially critical and effective treatments are realized at exposure times as short as $1 \times 10^{-5}$ second and no adverse effects are noted at times as long as 60 seconds. Preferably, the exposure time should be not less than $4 \times 10^{-4}$ second.

The process of this invention is particularly advantageous for, and will be hereinafter described with specific reference to, the surface treatment of preformed structures, and particularly sheet structures, of perfluorocarbon polymers such as copolymers of tetrafluoroethylene and hexafluoropropene having from 50% to 95% by weight of tetrafluoroethylene (U.S.P. 2,833,686). However, the process hereindisclosed is also applicable to other thermoplastic perfluorocarbon structures as well as to structures of polyolefins, polyesters, polyamides, etc.

The following examples will serve to further illustrate the principles and practice of this invention.

Example 1

A. A film 10 mils thick and 15 inches wide melt extruded through a hopper slot at 385° C. from a tetrafluoroethylene/hexafluoropropene copolymer (weight ratio 85/15) was drawn through the electrical discharge apparatus of the type illustrated in FIGURE 1 at a rate of 6 feet/minute. The temperature of the film being drawn through the apparatus was 56° C. The apparatus equipped with three stationary hollow tube electrodes each of which was connected to a Lepel High Frequency Spark Generator Model HFSG. The setting on the unit was 55 (approximate 16 0.9 R.M.S. amperes) for each electrode. An atmosphere of diethylene triamine (approximately 0.7% by volume) and nitrogen was maintained between the electrodes by passing a stream of nitrogen at a rate of about 4 cubic feet/minute through liquid diethylene triamine and conducting the exit gases through the hollow tube electrodes into the electrode gaps at atmospheric pressure.

B. After treatment the film was laminated to bright copper foil at 290° C. under a pressure of 10 p.s.i. The resulting laminate showed a peel bond strength of 6000 grams/inch of film width on a Suter Peel Tester at a pull rate of 12 inches/minute and a peel angle of 180°. A control film treated as described under A above but without the diethylene triamine vapor in the electrical discharge showed substantially no adhesion to bright copper foil. Another control film treated as described under A but with an atmosphere of glycidyl methacrylate vapor instead of diethylene triamine vapor in the electrical discharge, following the procedure of patent application Seiral No. 282,947 mentioned earlier, when made into a laminate with bright copper foil showed a bond strength of 2500 grams/inch.

C. In a similar manner the treated film and a polyimide film 2 mils thick prepared as described in U.S. application Serial No. 169,120, filed on January 26, 1962, now Patent No. 3,179,634, by W. M. Edwards, was laminated in a hot nip roll laminator at 288° C. at a speed of 10 feet/minute. The resulting laminate showed a bond strength of 1500 grams/inch whereas a film treated in an atmosphere of glycidyl methacrylate in the electrical discharge instead of diethylene triamine showed a maximum bond strength of 700 grams in a parallel control test. A similar laminate made from a copolymer film treated as described under A but with ethylene diamine vapor in the electrical discharge showed a bond strength of 1200 grams/inch.

Examples 2–10

Following the general procedure described in Example 1, the copolymer film described in Example 1 was treated in the electrical discharge under the gaseous atmospheres indicated in the table below. The resulting treated films were bonded to metal foils and the degree of adhesion was determined. The results obtained on copper foil are shown in the table below.

TABLE I

| Example | Vapor in Electrical Discharge | Peel Bond to Copper, Grams/inch |
|---|---|---|
| 2 | Cyclohexyl amine | 4,000 |
| 3 | Triethylene tetramine | 5,500 |
| 4 | Tetraethylene pentamine | 5,000 |
| 5 | Decyl amine | 4,000 |
| 6 | Tertiary butyl amine | 4,000 |
| 7 | Methylisopropyl amine | 4,500 |
| 8 | Propylene diamine | 5,000 |
| 9 | Ethylene diamine | 5,000 |
| 10 | Triethyl amine | 5,000 |
| Control | Glycidyl methacrylate | 2,500 |
| Control | Vinyl acetate | 2,000 |
| Control | Nitrogen | 100 |

As illustrated, when the film was treated in the electrical discharge with the vapor of a compound other than an amine, the adhesion values were approximately ½ of the value obtained when the vapor of the amine was present. When only nitrogen was present in the electrical discharge, there was substantially no adhesion between the treated film and the copper foil. Results similar to those described above were obtained on laminations of the treated film to steel and aluminum foils.

I claim:

1. A process for rendering surfaces of shaped structures of organic polymeric materials strongly adherent to other materials which comprises subjecting the surface of an organic polymeric shaped structure to the action of an electrical discharge at substantially atmospheric pressure between spaced positive and negative electrodes maintained at a voltage differential in excess of about 1000 volts, said electrical discharge having an energy level below 15 electron volts, in a substantially oxygen gas-free atmosphere containing less than about 5% by volume of the vapor of an amine in an inert gaseous carrier, whereby to render said surface strongly adherable to other materials.

2. The process of claim 1 wherein the shaped structure is a structure of a perfluorocarbon polymer.

3. A process for rendering the surface of a film of a perfluorocarbon polymer adherent to other materials which comprises subjecting the surface of a film of perfluorocarbon to the action of an electrical discharge at substantially atmospheric pressure between spaced positive and negative electrodes maintained at a voltage differential in excess of about 2000 volts, said electrical discharge having an energy level below 15 electron volts, in a substantially oxygen gas-free atmosphere containing less than about 5% by volume of the vapor of an amine in an inert gaseous carrier.

4. The process of claim 3 wherein the perfluorocarbon polymer is a copolymer of tetrafluoroethylene and hexafluoropropene.

5. The process of claim 3 wherein the atmosphere consists essentially of introgen and the vapor of a polyamine.

6. The process of claim 5 wherein said polyamine is diethylene triamine.

7. The process of claim 5 wherein said polyamine is ethylene diamine.

8. The process of claim 5 wherein said polyamine is triethylene tetramine.

References Cited by the Examiner
UNITED STATES PATENTS

| | | | |
|---|---|---|---|
| 3,030,290 | 4/1962 | Ryan | 204—169 |
| 3,068,510 | 12/1962 | Coleman | 204—165 |

FOREIGN PATENTS 845,897  8/1960  Great Britain.

JOHN H. MACK, *Primary Examiner.*

H. S. WILLIAMS, *Assistant Examiner.*